United States Patent [19]

Katayama et al.

[11] Patent Number: 5,471,439
[45] Date of Patent: Nov. 28, 1995

[54] MAGNETIC HEAD DEVICE WITH SLIDABLE AND ADJUSTABLE MAGNETIC HEAD

[75] Inventors: Yoshio Katayama; Seiichi Fujii; Sadao Uchiyama; Ryouichi Soejima; Hitoshi Moori; Hideo Yoshida, all of Higashihiroshima, Japan

[73] Assignee: Sharp Kabushiki Kaisha, Japan

[21] Appl. No.: 9,064

[22] Filed: Jan. 26, 1993

[30] Foreign Application Priority Data

Feb. 14, 1992  [JP]  Japan ..................... 4-027614

[51] Int. Cl.⁶ ........................... G11B 11/10; G11B 5/54
[52] U.S. Cl. ..................................... 369/13; 360/105
[58] Field of Search ........................... 360/105, 114, 360/66, 97.01, 103, 105; 369/13

[56] References Cited

U.S. PATENT DOCUMENTS

| | | | |
|---|---|---|---|
| 4,712,203 | 12/1987 | Saito et al. | 360/114 |
| 4,819,091 | 4/1989 | Brezoczky et al. | 360/97.01 |
| 4,843,600 | 6/1989 | Miyajima et al. | 360/114 |
| 5,020,041 | 5/1991 | Nakao et al. | 360/114 |
| 5,043,959 | 8/1991 | Minami et al. | 360/114 |
| 5,060,207 | 10/1991 | Kaneda et al. | 369/13 |
| 5,068,841 | 11/1991 | Nakayama et al. | 369/13 |
| 5,111,441 | 5/1992 | Eto et al. | 360/66 |
| 5,122,998 | 6/1992 | Mizuno et al. | 360/114 |
| 5,179,544 | 1/1993 | Hezemans et al. | 360/114 |
| 5,223,998 | 6/1993 | Tokuyama et al. | 360/103 |

FOREIGN PATENT DOCUMENTS

| | | |
|---|---|---|
| 0390260 | 10/1990 | European Pat. Off. . |
| 0403266 | 12/1990 | European Pat. Off. . |
| 61-198433 | 9/1986 | Japan ..................... 360/114 |
| 63-091852 | 4/1988 | Japan . |
| 63-311644 | 12/1988 | Japan . |
| 172373 | 3/1989 | Japan ..................... 360/114 |
| 214440 | 1/1990 | Japan ..................... 360/114 |
| 2203418 | 8/1990 | Japan . |
| 2265055 | 10/1990 | Japan . |
| 3-142701 | 6/1991 | Japan . |
| 4-13254 | 3/1992 | Japan . |
| 4-245045 | 9/1992 | Japan . |

*Primary Examiner*—Stuart S. Levy
*Assistant Examiner*—Brian E. Miller
*Attorney, Agent, or Firm*—Nixon & Vanderhye

[57] ABSTRACT

A magneto-optical recording and reproducing apparatus for recording a recording data on a magneto-optical disk through magnetic field modulation is provided with a magnetic head device for applying a recording magnetic field corresponding to a recording signal current onto the magneto-optical disk. The magnetic head means is composed of coil support means including a hollow tubular portion, coil means provided outside the hollow tubular portion of the coil support means, magnetic head means, provided within the hollow tubular portion of the coil support means so as to be capable of freely sliding, for generating the recording magnetic field by supplying the recording signal current into the coil means, and elastic support means for supporting the magnetic head means so as to place it in a stand-by position where the magnetic head means and the magneto-optical disk do not interfere with one another by a push-up force exerted on the magnetic head means in the direction moving away from the magneto-optical disk. The magnetic head means is moved toward the magneto-optical disk in a direction opposite to the push-up force exerted by the elastic support means so as to come in contact with the magneto-optical disk using an electromagnetic force generated by supplying the recording signal current into the coil means.

13 Claims, 12 Drawing Sheets

MAGNETIC HEAD DEVICE WITH SLIDABLE AND ADJUSTABLE MAGNETIC HEAD

FIELD OF THE INVENTION

The present invention relates to a magnetic head device and a magneto-optical recording and reproducing apparatus for recording and reproducing information through magnetic field modulation.

BACKGROUND OF THE INVENTION

The magneto-optical recording and reproducing apparatuses adopting the magnetic field modulation perform recording and reproducing information in the following way. In recording information, while projecting a laser beam, an external magnetic field is applied onto a magnetic film of a magneto-optical disk, and information is recorded by modulating the external magnetic field. In reproducing information, a laser beam is projected onto the magnetic film of the magneto-optical disk, and the information is reproduced by detecting the light reflected therefrom. Therefore, how fast the information can be recorded is determined by the speed in reversing the magnetic field of the magnetic film. For this reason, the magneto-optical recording and reproducing apparatus adopting the magnetic field modulation requires a magnetic head device designed for magneto-optical disks including a compact magnetic head separately provided for magnetic field modulation.

In the conventional magneto-optical recording and reproducing apparatuses, for example, a fixed type of magnetic head device designed for magneto-optical disks shown in FIGS. 16 and 17 has been employed, and the configuration thereof will be described below.

FIG. 16 is a view showing a schematic configuration of a magneto-optical recording and reproducing apparatus employing a fixed-type magnetic head device. FIG. 17 is an enlarged view showing essential parts of the magnetic head device.

As shown in the figures, a magneto-optical disk (hereinafter simply referred to as a disk) 101 includes a transparent plate 101a, a magnetic film 101b, and a protective film 101c. An optical pickup 102 is provided for recording information by projecting a laser beam onto the disk 101 and for reproducing the information by projecting a laser beam onto the disk 101 and detecting the light reflected therefrom. A magnetic head 103 includes a magnetic substance having a coil 103a wound around the circumference thereof. A turn table 104 for rotating the disk 101 is directly connected to a spindle motor. A connecting member 105 connects the optical pickup 102 and the magnetic head 103 which are placed so as to face one another having the optical disk 101 in between. The optical pickup 102 and the magnetic head 103 are interlocked by the connecting member 105 when they are moved in a radial direction of the disk 101.

According to the above arrangement, in recording information, by projecting a strong laser beam from the optical pickup 102 onto the rotating disk 101, the temperature of the magnetic film 101b raises above its Curie temperature, and a magnetic field corresponding to a recording signal is applied from the magnetic head 103 onto the magnetic film 101b. As a result, the magnetization of the magnetic film 101b is arranged in a predetermined direction, thereby recording information. In reproducing information, a weak laser beam is projected from the optical pickup 102 onto the disk 101, and the optical pickup 102 detects the light reflected from the disk 101, thereby reproducing the information.

In the described fixed type magnetic head device, when the disk 101 vibrates as it rotates, it may hit the magnetic head 103. In order to avoid this, a space $\delta_{10}$ of substantially 0.5–1.0 mm is required between the disk 101 and the magnetic head 103. For this reason, the coil 103a is required to be made larger in order to generate a sufficient magnetic field for recording onto the magnetic film 101b of the disk 101. However, if the coil 103a is made larger, the magnetic head 103 also becomes larger in size. Furthermore, the speed in reversing the magnetic field is reduced, and the above problem is a serious drawback in high speed and high density recording.

In order to counteract this problem, a floating type magnetic head device shown in FIGS. 18 and 19 has been conventionally proposed. The floating type magnetic head device includes a magnetic head 103, a slider 106 integrally provided with the magnetic head 103, and a support arm 107 composed of a spring for supporting the magnetic head 103 and the slider 106. In this arrangement, the magnetic head 103 is floated as the slider 106 receives an air flow generated when the disk 101 rotates at high speed. Further, a space $\delta_{11}$ of several μm multiplied by ten is maintained between the disk 101 and the magnetic head 103.

The above arrangement of the magnetic head device permits a reduction in the distance between the magnetic head 103 and the magnetic film 101b of the disk 101. As a result, the coil 103a of the magnetic head 103 can be made smaller, thereby enabling a higher speed and a higher density recording.

In the magneto-optical recording and reproducing apparatus wherein the disk 101 is being rotated at high speed, a sufficient floating force is exerted toward the floating type magnetic head device. However, in the magneto-optical recording and reproducing apparatus wherein the disk 101 is being rotated at relatively low speed, a sufficient floating force is not exerted. Therefore, the floating type magnetic head can be used only in the magneto-optical recording and reproducing apparatus wherein the disk 101 is being rotated at high speed.

Moreover, even when a sufficient floating force is exerted toward the floating type magnetic head device, a compact coil is required for the high speed and high density recording. Thus, the space between the magnetic head 103 and the disk 101 needs to be set extremely small. However, as the space between the magnetic head 103 and the disk 101 is made smaller, the possibility for the disk 101 hitting the magnetic head 103 increases when the disk 101 vibrates.

SUMMARY OF THE INVENTION

An object of the present invention is to provide a magnetic head device and a magneto-optical recording and reproducing apparatus having the magnetic head device designed for magneto-optical disks whereon high speed and high density recording operations can be performed.

In order to achieve the above object, the magneto-optical recording and reproducing apparatus in accordance with the present invention for recording a recording data on a magneto-optical disk through magnetic field modulation is provided with a magnetic head device for applying a recording magnetic field corresponding to a recording signal current onto the magneto-optical disk. Further, the magnetic head device is characterized by including: coil support means having a hollow tubular portion; coil means provided outside the hollow tubular portion of the coil support means; magnetic head means, provided within the hollow tubular portion of the coil support means so as to be capable of freely sliding, for generating a recording magnetic field by supplying a recording signal current into the coil means; and elastic support means for supporting the magnetic head means so as to place it in a stand-by position where the magnetic head means and the magneto-optical disk do not interfere with one another by a push-up force exerted on the magnetic head in a direction moving away from the magneto-optical disk. In the above arrangement, the magnetic head device activates the magnetic head means to move toward the magneto-optical disk in a direction opposite to the push-up force exerted by the elastic support means so as to come in contact with the magneto-optical disk using an electromagnetic force generated by supplying the recording signal current in the coil means.

In the above arrangement, when a recording operation is to be carried out, the magnetic head means is moved toward the magneto-optical disk so as to come in contact therewith. This permits a reduction in the distance between the magnetic head means and the magneto-optical disk, and a magnetic field sufficient for recording on the magnetic film can be achieved even with a compact size magnetic head device. This also permits an increase in the speed of reversing the magnetic field, thereby enabling high speed and high density recording operations. Furthermore, when the magnetic head means is moved, and a recording magnetic field is generated, common coil means and a recording signal current are used. This permits a simplification of the structure of the magnetic head device and a reduction in the manufacturing cost.

Further, when recording, the magnetic head means is always in contact with the magneto-optical disk. Thus, unlike the conventional magnetic head devices wherein the magneto-optical disk and the magnetic head means face one another with a small space in between, and alternate collisions may occur between the disk and the magnetic head means, by setting the contacting pressure between them small, the magnetic head means and the magneto-optical disk can be prevented from breaking down. Only in the recording operation, they are in contact with one another, whereby the damage between them can be minimized.

Further, the spring supporting member is characterized by being provided on the magnetic head means having in between position adjusting means capable of setting the distance between the spring supporting member and the magnetic head means as desired.

In addition to the above function and effect, the contacting pressure between the magnetic head means and the magneto-optical disk can be adjusted, and the fluctuation in the contacting pressure can be eliminated.

Furthermore, the magnetic head means is characterized by including a buffer on the portion in contact with the magneto-optical disk.

In this way, the impact when the magnetic head means comes in contact with the magneto-optical disk can be reduced. The buffer also serves to protect the surface of the magneto-optical disk from being damaged when the magnetic head is in contact therewith.

The magnetic head means also includes position adjusting means which permits an adjustment of the stand-by position.

This permits an adjustment of the distance in the stand-by position between the magnetic head means and the magneto-optical disk to the shortest distance which can avoid a collision between them due to the fluttering of the disk, etc.

Thus, the distance which the magnetic head means moves can be made shortest. As a result, the impact when the magnetic head comes in contact with the magneto-optical disk can be reduced.

The magneto-optical recording and reproducing apparatus provided with the magnetic head device is characterized by including memory means for temporarily storing recording data and control means. When the recording operation is to be performed, the control means generates electromagnetic force by supplying an excitation current into the coil means, and moves the magnetic head means toward the magneto-optical disk in a direction opposite to the push-up force exerted by the elastic support means so as to come in contact with the magneto-optical disk. Then, after the normal rotation state of the magneto-optical disk is recovered, the control means signals to read out the recording data from the memory means, and the recording signal current corresponding to the recording data is supplied to the coil means after being switched into the excitation current.

According to the above arrangement, after the normal rotation state of the magneto-optical disk is recovered, the recording signal current is supplied to the coil means. As a result, the recording data can be accurately recorded without missing the initial part nor being interrupted by the reduction in the rotation speed of the magneto-optical disk due to the magnetic head means being contact therewith.

The control means includes dummy current generation means. When it is set in a pause state during the recording operation, the dummy current generation means supplies a dummy signal current for maintaining the contact state between the magnetic head means and the magneto-optical disk after being switched into the recording signal current.

Therefore, even if it is set in a pause state during the recording operation, the contact state between the magnetic head means and the magneto-optical disk can be maintained using the dummy signal current. This permits a prompt restart of the recording operation and an accurate recording of the recording data without creating blanks in the recording data.

A magneto-optical recording and reproducing apparatus is characterized by comprising a magnetic head device which includes; magnetic head means having a first coil and a first magnetic substance, for generating a recording magnetic field from the first magnetic substance by supplying a recording signal current into the first coil; elastic support means for supporting the magnetic head means so as to place it in a stand-by position where said magnetic head means and the magneto-optical disk do not interfere with one another by a push-up force exerted on said magnetic head means in a direction moving away from the magneto-optical disk; and head moving means having a second coil for moving said magnetic head means toward the magneto-optical disk in a direction opposite to the force exerted by said elastic support means using an electromagnetic force generated from the second coil so as to come in contact with the magneto-optical disk when a recording operation is started. The magneto-optical recording and reproducing apparatus is also characterized by comprising control means which includes head drive means for supplying a recording signal current corresponding to the recording data into the first coil; and up-down drive means for generating an electromagnetic force by supplying an excitation current into the second coil.

In the above arrangement, a DC current can be supplied instead of an AC current such as a recording signal current into the coil means of the head moving means. This permits an achievement of a constant electromagnetic force, thereby stabilizing the contact pressure between the magnetic head means and the magneto-optical disk.

After the magnetic head means comes in contact with the magneto-optical disk, the up-down drive means switches from the excitation current to the maintenance current which is a minimum current for maintaining the contact state between the magnetic head means and the magneto-optical disk.

The above arrangement enables the magnetic head means to promptly come in contact with the magneto-optical disk. The current being supplied to the second coil of the head moving means is switched to the maintenance current which is the minimum current used in maintaining the contact state between the magnetic head means and the magneto-optical disk, thereby reducing a frictional resistance between them.

The control means of the magneto-optical recording and reproducing apparatus includes memory means for temporarily storing the recording data. When the recording operation is started, the control means supplies the excitation current into the coil means so as to generate the electromagnetic force, and move the magnetic head means to the magneto-optical disk in a direction opposite to the push-up force exerted from the elastic support means so as to come in contact with the magneto-optical disk. Then, after the normal rotation state of the magneto-optical disk is recovered, the recording data is read out from the memory means. The recording signal current is supplied to the coil means after being switched into the excitation current. In the meantime, the recording portion irradiated with the laser beam is raised above its Curie temperature.

According to the above arrangement, after the magnetic head means comes in contact with the magneto-optical disk, and the normal rotation speed of the magneto-optical disk is recovered, the recording portion is raised above the Curie temperature. Since the recording operation can be preformed on the magneto-optical disk only after having the temperature raise in the recording portion, and the recording operation is not performed before nor after the magnetic head comes in contact with the magneto-optical disk. As a result, the recording operation can always be performed accurately.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a view showing a schematic configuration of a magneto-optical recording and reproducing apparatus employing a magnetic head device using magnetic field modulation.

FIG. 2 is an enlarged view showing essential parts of the magnetic head device having a magnetic head positioned at a stand-by position.

FIG. 3 is an enlarged view showing essential parts of the magnetic head device having a magnetic head in contact with the magneto-optical disk.

FIG. 4 is an enlarged view showing essential parts of the magnetic head device having a magnetic head positioned at a stand-by position.

FIG. 5 is an enlarged view showing essential parts of the magnetic head device having a magnetic head in contact with the magneto-optical disk.

FIG. 6 is an enlarged view showing essential parts of the magnetic head device having a magnetic head positioned at a stand-by position.

FIG. 7 is an enlarged view showing essential parts of the magnetic head device having a magnetic head in contact with the magneto-optical disk.

FIG. 8 is a view showing a schematic configuration of a magneto-optical recording and reproducing apparatus which employs magnetic field modulation and is provided with a magnetic head device in a stand-by state.

FIG. 9 is a view showing a schematic configuration of a magneto-optical recording and reproducing apparatus which employs magnetic field modulation and is provided with a magnetic head device in a recording operation.

FIG. 16 is a view showing a schematic configuration of a magneto-optical recording and reproducing apparatus employing a fixed-type magnetic head device.

FIG. 17 is an enlarged view showing essential parts of a fixed-type magnetic head device.

FIG. 18 is a view showing a schematic configuration of a magneto-optical recording and reproducing apparatus employing a floating-type magnetic head device.

FIG. 19 is an enlarged view showing essential parts of the floating-type magnetic head device.

DESCRIPTION OF THE EMBODIMENTS

Figure 1:
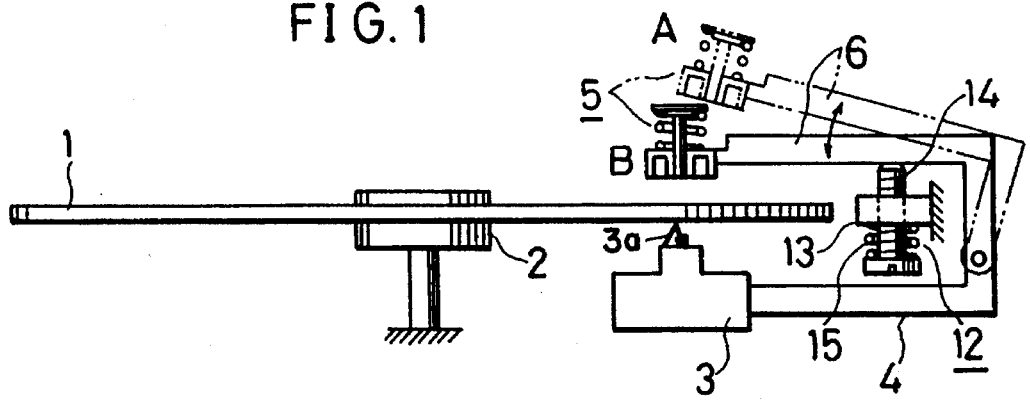
FIGS. 1 through 3 show the first embodiment of the present invention.
Figure 2:
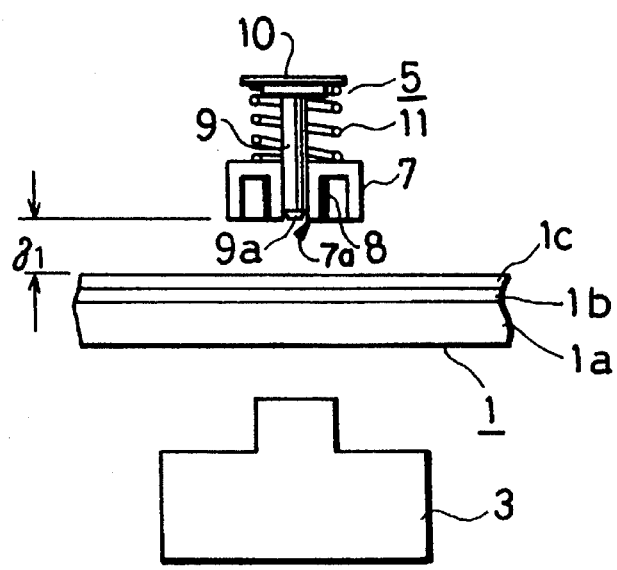
Figure 3:
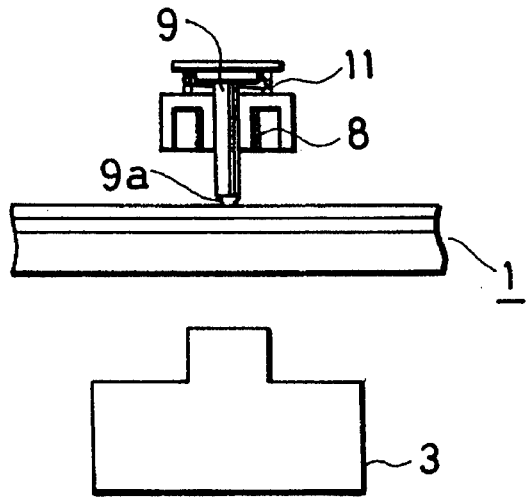

The following description will discuss the first embodiment of the present invention with reference to FIGS. 1 through 3.

FIG. 1 is a view showing a schematic configuration of a magneto-optical recording and reproducing apparatus using the magnetic field modulation provided with a magnetic head device designed for a magneto-optical disk in accordance with the first embodiment of the present invention.

FIG. 2 is an enlarged view explaining essential parts of the magnetic head device in a stand-by state. FIG. 3 is an enlarged view explaining the magnetic head device in a recording state.

As shown in the figures, a magneto-optical disk (hereinafter simply referred to as a disk) 1 includes a transparent plate 1a, a magnetic film 1b, and a protective film 1c. A turn table 2 for rotating the disk 1 is directly connected to a spindle motor (not shown). An optical pickup 3 is provided for recording information (recording data) by projecting a strong laser beam 3a onto the disk 1 so as to raise the temperature of the magnetic film 1b above its Curie temperature and for reproducing the information (recording data) by projecting a laser beam onto the disk 1 and detecting the light reflected therefrom. A magnetic head 5 is provided for generating the magnetic field for use in recording.

The optical pickup 3 and the magnetic head device 5, which are placed so as to face one another having the disk 1 in between, move integrally. The optical pickup 3 and the magnetic head device 5 are supported by a moving stand (not shown) via arms 4 and 6. The moving stand is designed so as to move in the direction perpendicular to the plane of FIG. 1. In this arrangement, the optical pickup 3 and the magnetic head device 5, which are supported by the moving stand, move in a radial direction of the disk 1 maintaining the relative position between them.

In fact, the optical pickup 3 and the magnetic head device 5 are placed overlapping the turn table 2 in FIG. 1. Here, for convenience, they are displaced from the actual positions.

The arm 6 is provided on the moving stand so that the end thereof is freely rotatable. The magnetic head device 5 supported by the arm 6 is designed so as to be capable of moving at least between a stand-by position B close to the disk 1 and a retreat position A moved away from the disk 1. Further, the moving stand is provided with arm moving means (not shown) for moving the magnetic head device 5 between the positions A and B. In recording, the magnetic head device 5 is moved to the stand-by position B of the stand-by state by the arm moving means. When it is not recording, for example in reproducing, the magnetic head device 5 is moved to the retreat position A by the arm moving means.

The magnetic head 5, supported by the arm 6, includes a coil supporting member 7, a coil 8, a magnetic member 9, a spring 11, and a position adjusting means 12. The coil supporting member 7 has a hollow tubular portion 7a at the center thereof (see FIG. 2). The coil 8 is wound around the circumference of the hollow tubular portion 7a. The magnetic member 9 includes a magnetic substance capable of freely sliding in the hollow tubular portion 7a of the coil supporting member 7.

Further, the spring 11 is provided so as to connect a spring supporting member 10, placed on the top surface of the magnetic member 9, and the coil supporting member 7. The spring 11 pushes up the magnetic member 9 in a direction moving away from the disk 1. The position adjusting member 12 is provided for adjusting the position of the magnetic member 9 including the coil supporting member 7.

In the stand-by position B, the coil supporting member 7 and the magnetic member 9 are placed so as to maintain the distance $\delta_1$ from the disk 1 so that they do not interfere with one another when the disk 1 vibrates. Additionally, the space $\delta_1$ can be slightly adjusted by the position adjusting member 12 (whose configuration will be described later).

As described, the magnetic head device 5 is integrally moved with the optical pickup device 3. Here, the magnetic member 9 is required to be moved integrally with the shift of a laser spot formed by projecting the laser beam from the optical pickup 3. For this reason, the magnetic head device 5 is provided with at least a laser spot following means (not shown) in order to accurately place the magnetic member 9 in the position where the laser spot is formed. Alternatively, the laser spot following means may be designed so as to slightly adjust the position of the entire magnetic head device 5 with respect to a moving object.

By supplying a current into the coil 8, the coil 8 activates the magnetic member 9 so as to generate the magnetic field. The coil 8 also activates the magnetic head 9 to generate the electromagnetic force for moving it toward the disk in a direction opposite to the push-up force exerted from the spring 11. Therefore, the coil 8 serves both as the coil of the magnetic member 9 and as head moving means of the magnetic member 9.

The magnetic member 9 also has a buffer 9a at a portion in contact with the surface of the disk 1. The buffer 9a is formed by laminating films made of polyimide or by coating with molybdenum, ceramic, etc. The buffer 9a serves to reduce the impact force generated when the magnetic member 9 comes in contact with the disk 1. Therefore, the magnetic member 9 and the disk 1 can be prevented from being damaged due to the contact between them in the recording operation.

Both the spring 11 and the spring supporting member 10 serve as elastic support means for flexibly supporting the magnetic head 9 in the stand-by position with the balance between the depressing force of the spring 11 and an electromagnetic force of the coil 8, the magnetic head 9 can be slightly in contact with the surface of the disk 1.

For example, the position adjusting means 12 is composed of a screw section 13 provided on the moving stand, an adjusting screw 14 which is mated with the screw section 13, and a spring 15, etc. As the adjusting screw 14 for supporting the magnetic head device 5 moves back and forth through the arm 6, respective positions of the coil supporting member 7 and the magnetic head device 5 can be adjusted.

When the recording operation is to be carried out, a current flows in the coil 8. Then, the magnetic head 9 moves toward the disk 1 by the electromagnetic force generated from the coil 8 in a direction opposite to the push-up force by the spring 11, and comes in contact with the disk 1 via the buffer 9a. As a result, the magnetic member 9 can apply the magnetic field corresponding to the recording current to the magnetic film 1b of the disk 1.

Since the above arrangement permits a sufficient reduction in the distance between the magnetic member 9 and the disk 1, the magnetic member 9 can generate a magnetic field sufficient for recording information on the magnetic film 1b even with the coil 8 of a compact size. As a result, the magnetic head device 5 of the present embodiment permits an increase in the speed of reversing the magnetic field, thereby enabling higher speed and higher density recording.

When the recording operation is to be carried out, the magnetic member 9 comes in sliding contact with the surface of the disk 1. However, compared with the case where the disk 1 and the magnetic member 9 are provided so as to face one another with a certain space in between, and the disk 1 and the magnetic member 9 irregularly hit one another, the possibility for the disk 1 and the magnetic member 9 being damaged can be reduced when a contact pressure is set at a small value. Therefore, the sliding contact between the magnetic member 9 and the disk 1 will not create any serious problems in the practical use.

Furthermore, the magnetic member 9 comes in contact with the disk 1 via the buffer 9a. The buffer 9a is provided for reducing the impact when the magnetic member 9 comes in contact with the disk and also for reducing the damage directly accompanied by the sliding contact between the magnetic member 9 and the disk 1. As described, with the buffer 9a, the magnetic head device 5 is made more suitable for practical use.

Furthermore, the distance between the magnetic head 9 and the disk 1 can be adjusted by the position adjusting means 12. Therefore, the magnetic head device 5 activates the position adjusting means 12 to reduce the distance between them to the shortest provided that an impact between the magnetic member 9 and the disk 1 due to the fluttering of the disk 1 can be prevented. As a result, the impact force generated as the magnetic member 9 comes in contact with the disk 1 can be still reduced.

Figure 4:
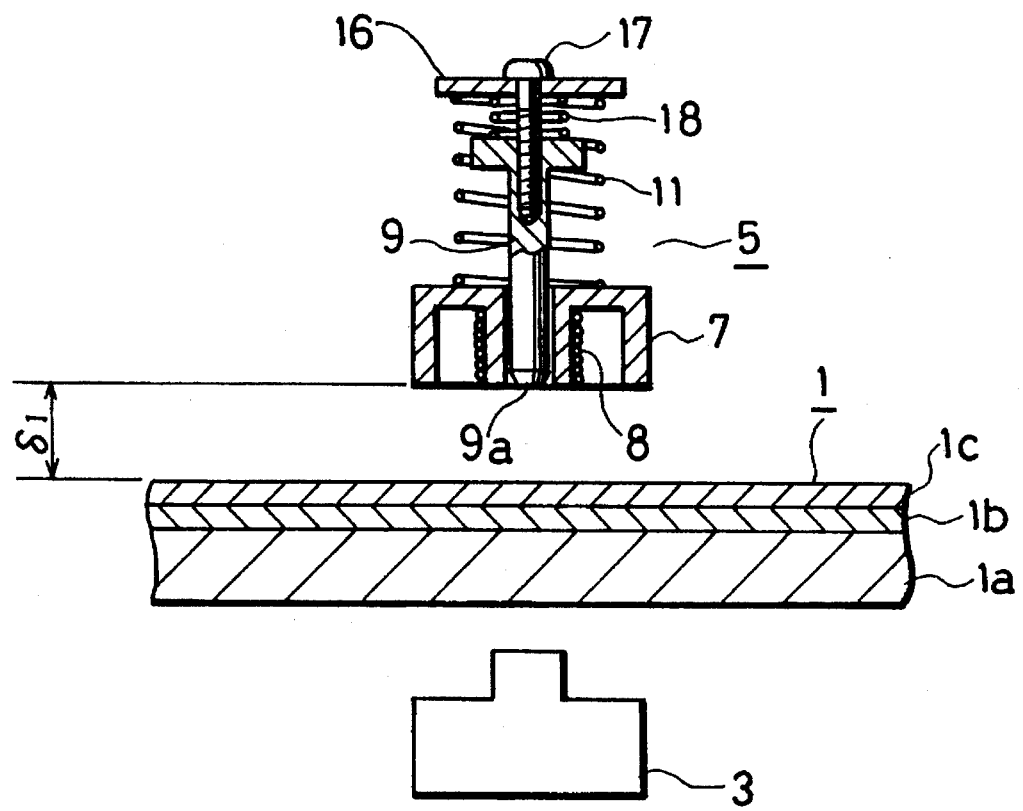
FIGS. 4 and 5 show the second embodiment of the present invention.
Figure 5:
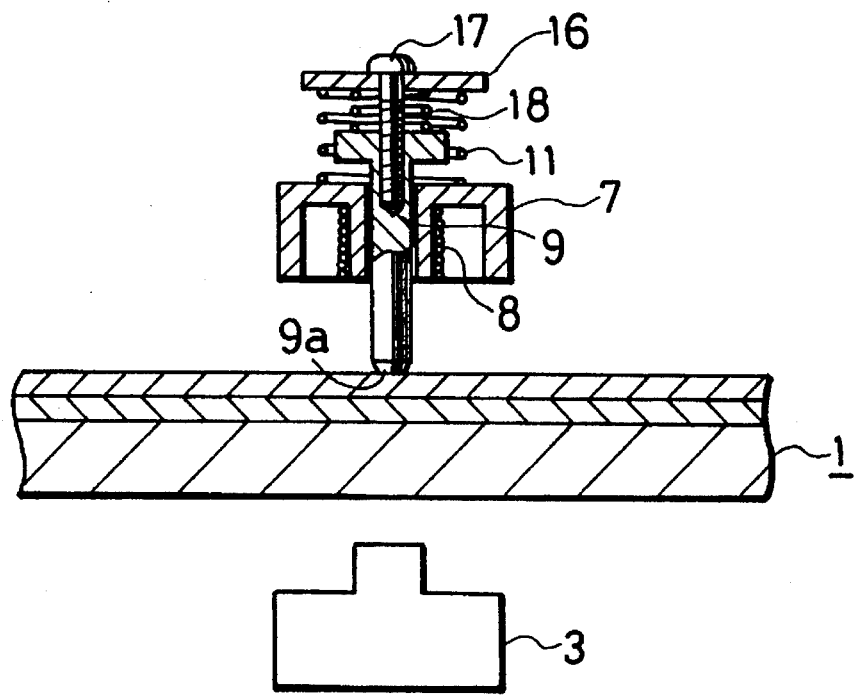

The following description will discuss the second embodiment of the present invention with reference to FIGS. 4 and 5.

FIG. 4 is an enlarged cross sectional view showing essential parts of the magnetic head device in the stand-by state. FIG. 5 is an enlarged cross sectional view showing essential parts of the magnetic head device in the recording state.

In addition to the arrangement of the magnetic head device of the first embodiment, the magnetic head device designed for magneto-optical disk provided in the magneto-optical recording and reproducing apparatus of the present embodiment is further provided with another spring 18 and an adjusting screw 17 which serve to adjust the contact pressure from the magnetic member 9 exerted toward the disk 1. The arrangement of the magnetic head device will be described below with reference to FIGS. 4 and 5. In the figures, members having the same functions as in the first embodiment will be designated by the same codes and their descriptions will be omitted.

The magnetic head device 5 includes the spring 11 (elastic support means) provided between the coil supporting member 7 and the spring supporting member 16, and another spring 18 provided between the top surface of the magnetic member 9 and the spring supporting member 16. The magnetic member 9 is mated with the adjusting screw 17 for screwing from the top surface of the spring supporting member 16. The adjusting screw 17 permits an adjustment of the distance between the magnetic member 9 and the spring supporting member 16 as desired.

In more detail, when the adjusting screw 17 is tightened, the distance between the magnetic member 9 and the spring supporting member 16 becomes shorter, and the push-up force from the spring 11 increases, and the balance between the push-up force and the electromagnetic force is no longer maintained. Namely, the contact force from the magnetic member 9 toward the surface of the disk 1 becomes smaller. On the other hand, when the adjusting screw is loosened, the push-up force from the spring 11 becomes smaller, and the contact pressure from the magnetic member 9 toward the disk 1 becomes larger.

In theory, the contact pressure between the magnetic member 9 and the disk 1 is preferably zero. In practice, however, a certain contact pressure is required in order to maintain a stable contact state considering the fluttering of the disk 1 when it rotates, etc. In the present embodiment, the adjusting screw 17 permits to set the contact pressure to the lowest limit. As a result, although the magnetic member 9 and the disk 1 are sliding contact with one another when the recording operation is carried out, the possibility of the magnetic member 9 and the disk 1 being damaged can be significantly reduced.

Figure 6:
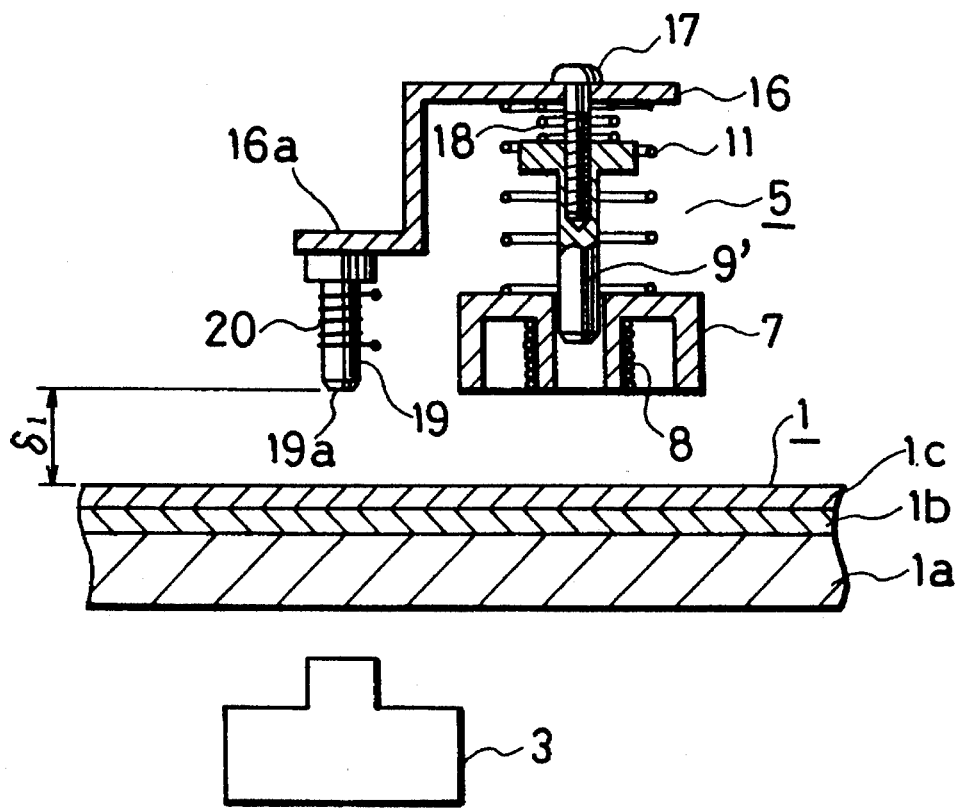
FIGS. 6 and 7 show the third embodiment of the present invention.
Figure 7:
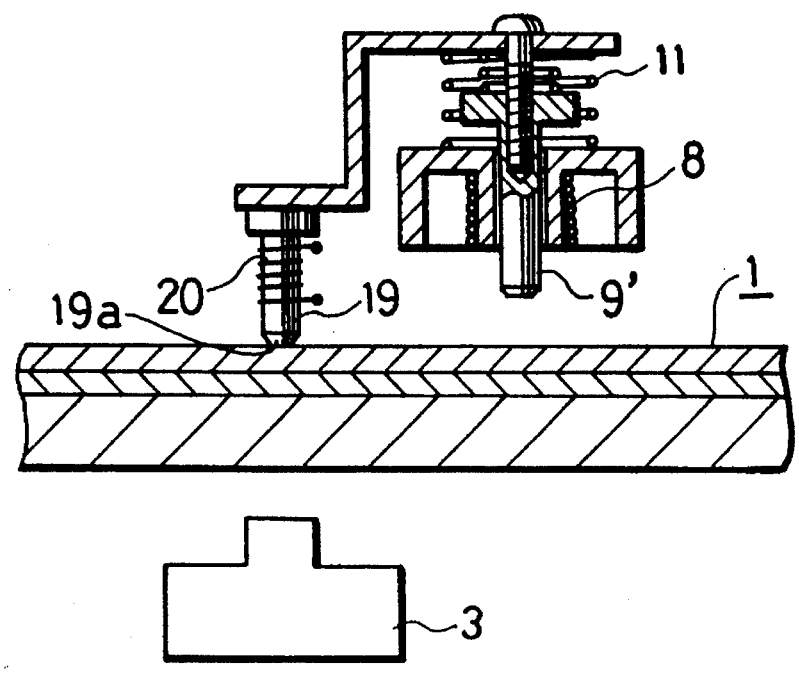

The following description will discuss the third embodiment of the present invention with reference to FIGS. 6 and 7.

FIG. 6 is an enlarged cross sectional view showing essential parts of the magnetic head device in the stand-by state. FIG. 7 is an enlarged cross sectional view showing essential parts of the magnetic head device in the recording state.

In the magnetic head device 5 provided in the magneto-optical recording and reproducing apparatus of the present embodiment, a coil for the magnetic head and a coil for head moving means are separately provided. However, the fundamental configuration is the same as that of the aforementioned embodiment shown in FIGS. 1 through 5. Thus, in FIG. 6, the members having the same functions as those shown in FIGS. 1 through 5 will be designated by the same codes and their descriptions will be omitted. However, the magnetic member 9 in FIGS. 1 through 5 is renamed as a magnetic substance 9'.

As shown in FIG. 6, a spring supporting member 16 includes an extended portion 16a. Further, a magnetic head 19 having a coil 20 wound around the circumference thereof is provided at the end of the extended portion 16a. Further, a buffer 19a is provided on a bottom surface of the magnetic head 19 as in the case of the first embodiment. In FIG. 6., the distance between the end of the magnetic head 19 and the surface of the disk 1 in the stand-by state is set $\delta_1$ as in the case of the first and the second embodiments. The magnetic substance 9', which does not serve as the magnetic head, is placed so as to have a longer distance from the disk 1 than 67 $_1$. Therefore, even when the magnetic head 19 comes in contact with the disk 1, the magnetic substance 9' does not come in contact with the surface of the disk 1.

The magnetic head device 5 having the above configuration has functions and effects similar to those in the first and the second embodiments.

Figure 8:
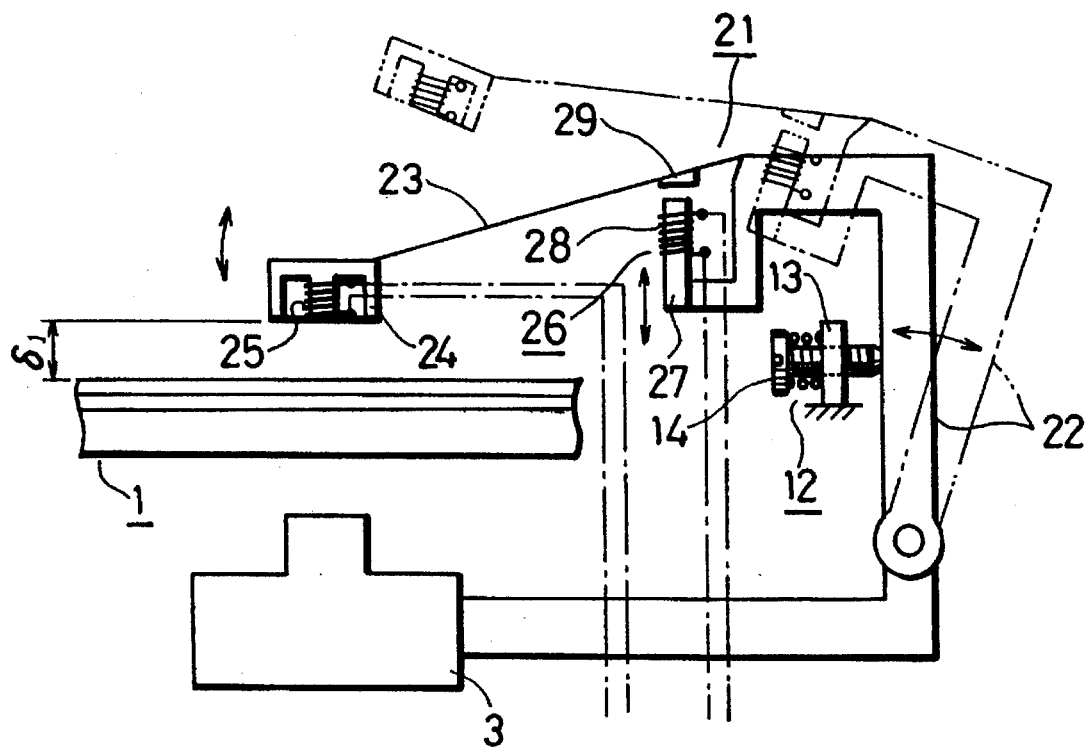
FIGS. 8 and 9 show the fourth embodiment of the present invention.
Figure 9:
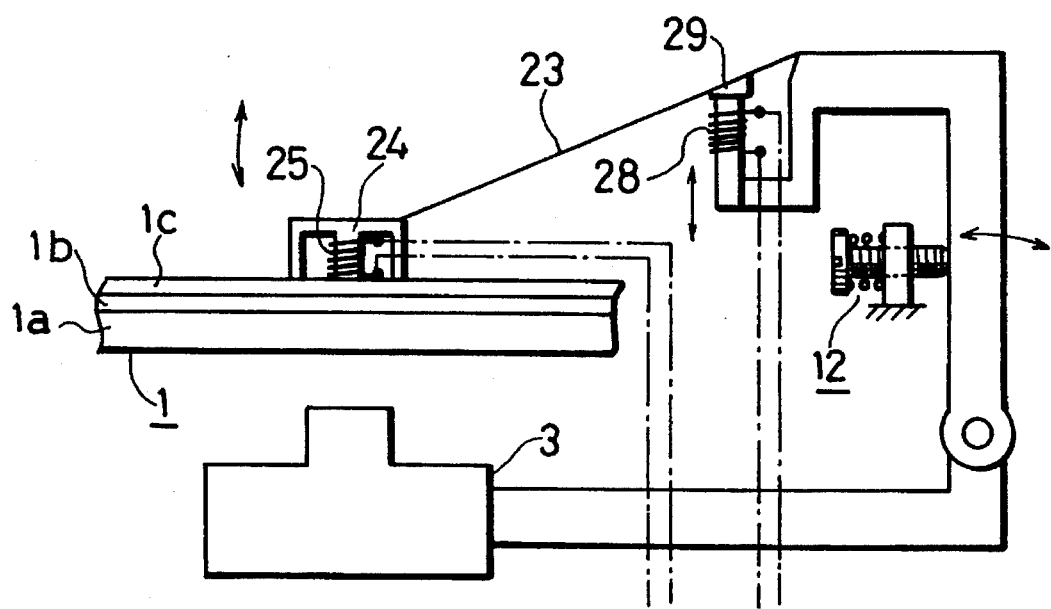

The following description will discuss the fourth embodiment of the present invention with reference to FIGS. 8 and 9.

FIG. 8 is a view showing a schematic configuration of a magneto-optical recording and reproducing apparatus which employs magnetic field modulation and is provided with a magnetic head device in a stand-by state. FIG. 9 is a view showing a schematic configuration of a magneto-optical recording and reproducing apparatus which employs a magnetic field modulation and is provided with a magnetic head device in a recording operation.

A magnetic head 21 provided in the magneto-optical recording and reproducing apparatus of the present embodiment is composed of a arm base 22, an elastic arm 23 (elastic support means) connected to the arm base 22, a magnetic head 24, head moving means 26, and a position adjusting means 12, etc. The arm base 22 is provided on the moving stand so as to be capable of rotating. The magnetic head 24 supported by one end of the elastic arm 23 has a coil 25 wound around an axis thereof. The elastic arm 23 flexibly supports the magnetic head 24, and the magnetic head 24 moved to a stand-by position by the arm base 22 and the elastic arm 23 is maintained a distance $\delta_1$ from the disk 1 where both the magnetic head 24 and the disk 1 do not interfere with one another.

Further, a head moving means 26 includes a magnetic substance 27, coil 28, and an adherence portion 29. The magnetic substance 27 provided at one end of the arm base 22 is placed below the elastic arm 23. The coil 28 is wound around the circumference of the magnetic substance 27. The adherence portion 29 provided on the elastic arm 23 is placed above the magnetic substance 27.

In the above arrangement of the magnetic head device 21, when the recording operation is to be carried out, current flows in the coil 28. Then, the adherence portion 29 is attached to the magnetic substance 27 by the electromagnetic force. As a result, the elastic arm 23 is bent so that the magnetic head 24 comes in contact with the disk 1. Here, the contact pressure exerted from the magnetic head 24 onto the disk 1 is determined by the bent of the elastic arm 23, which is controlled by the position adjusting means 12 by activating the magnetic substance 27 to move in an arrow direction in the figure. Therefore, the stand-by position of the magnetic head device 21 can be slightly adjusted by the position adjusting means 12 so as to have a small contact pressure.

In the stand-by state, a current is not applied in the coil 28. Therefore, the magnetic head 24 is placed in the stand-by position with the distance $\delta_1$ from the disk 1 adjusted by the elastic arm 23. As a result, the magnetic head 24 will not hit the disk 1 even when it vibrates.

Next, the controlling system of the magneto-optical recording and reproducing apparatus in each of the aforementioned embodiments will be described below.

Figure 10:
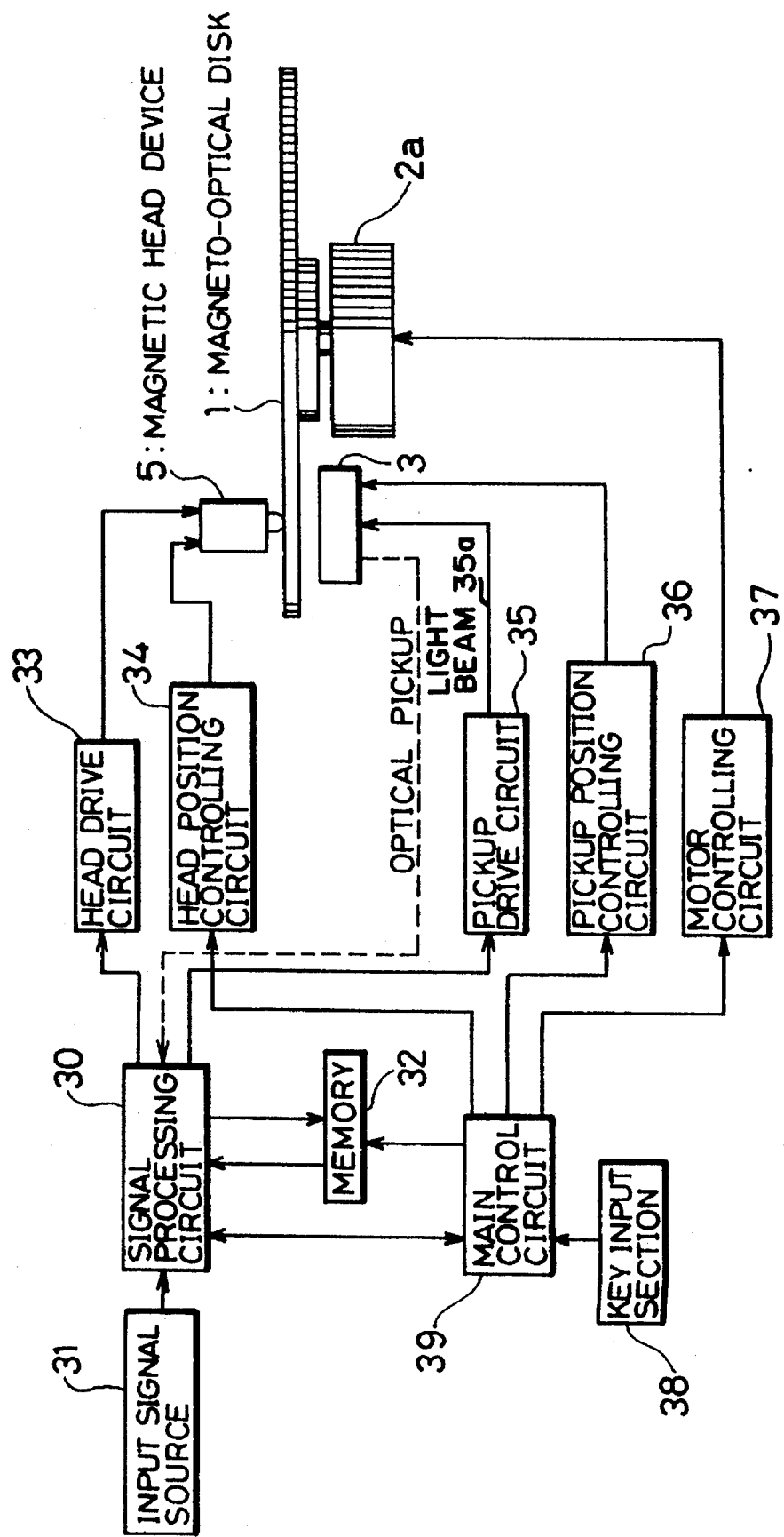
FIG. 10 is a block diagram showing an example of a controlling system of the magneto-optical recording and reproducing apparatus employing magnetic field modulation using a magnetic head device of the present invention.

FIG. 10 is a block diagram showing an example of the controlling systems of the magneto-optical recording and reproducing-apparatus. Referring to the block diagram, and the first embodiment shown in FIGS. 1 and 2, the case where a recording signal current is used in the drive control of the head moving means will be explained in detail.

A signal processing circuit 30 has the following functions: an A/D conversion function for converting an analog signal into a digital signal by receiving an input signal (for example, an analog signal) from an input signal source 31; an addition function for adding a parity bit and a cyclic code; and an interleaving processing function. A memory 32 is provided for storing a predetermined amount of signals processed by the signal processing circuit 30. A head drive circuit 33 activates the coil 8 of the magnetic head device 5 by receiving the signal from the signal processing circuit 30. A head position controlling circuit 34 is provided for controlling the arm moving means and laser spot following means of the magnetic head device 5. A pickup drive circuit 35 switches an intensity of the laser beam either to a high intensity or to a low intensity by controlling the light source of the optical pickup 3 based on the signal from the signal processing circuit 30. A pickup position controlling circuit 36 performs a drive control of the moving stand, and focusing and tracking controls of the optical pickup 3. A motor controlling circuit 37 controls the spindle motor 2a. A key input section 38 stores various input keys. A main control circuit 39 controls recording and reproducing operations based on the input signal, the signal processing circuit 30, the head position controlling circuit 34, the pickup position controlling circuit 36, the motor controlling circuit 37, etc., according to the control program stored in the apparatus.

Figure 11:
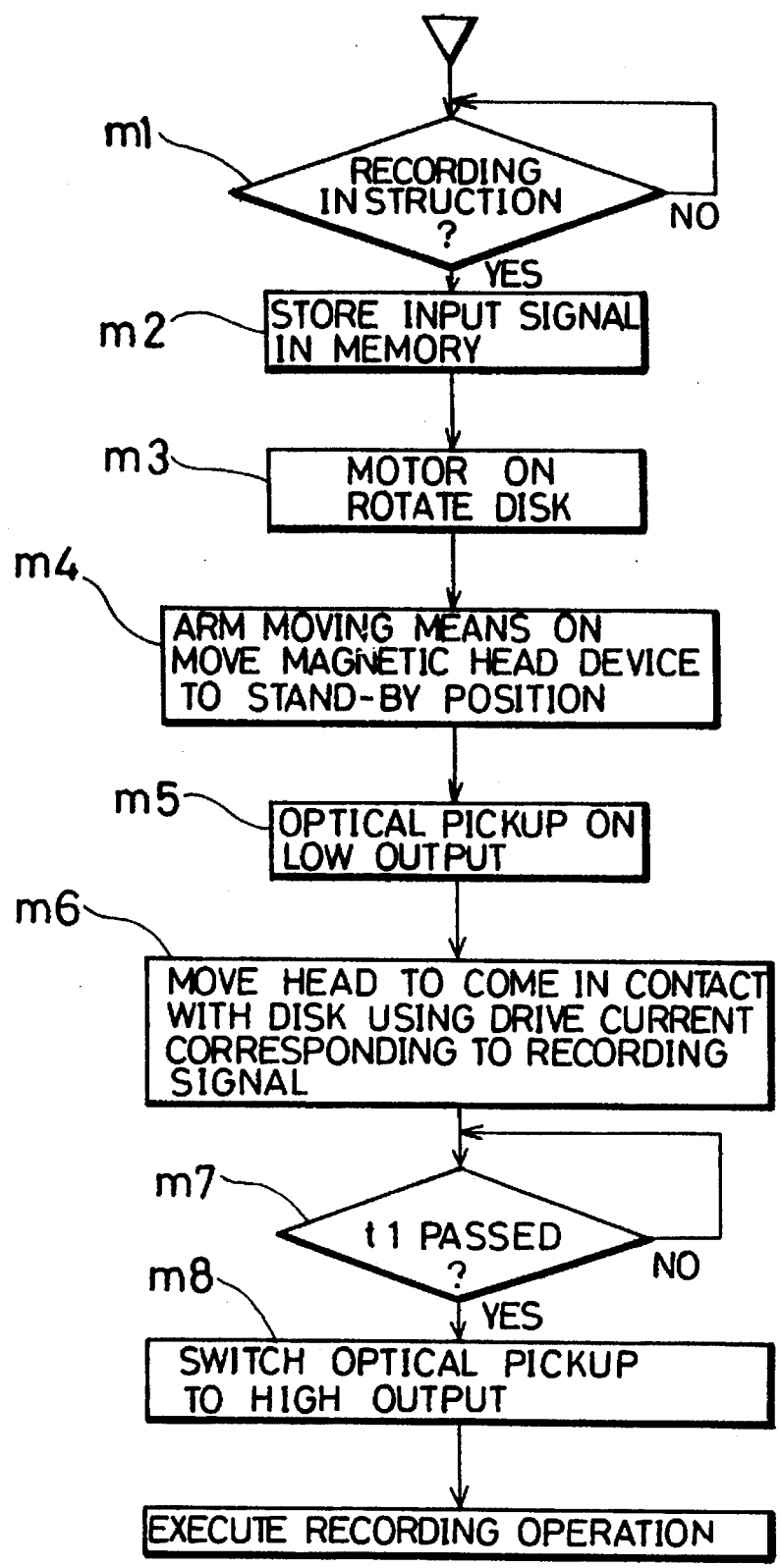
FIG. 11 is a flow chart showing an example of starting process for recording using a magneto-optical recording and reproducing apparatus.

The following will describe the recording operation of the magneto-optical recording and reproducing apparatus having the above controlling system with reference to the flow chart of FIG. 11.

First, a recording start area, a recording instruction, etc., are input in the key input section 38. Then, the main control circuit 39 confirms the recording instruction (Step m1). The main control circuit 39 instructs the signal processing circuit 30 to receive an input signal from the input signal source 31, then after having gone through various processes in the signal processing circuit 30, the signal is stored in the memory 32 (Step m2). After the motor controlling circuit 37 is turned ON, the rotation of the disk 1 set on the turn table 2 is started (Step m3). In the meantime, a timer starts counting.

Next, the main control circuit 39 signals to turn ON the head position controlling circuit 34 so as to output a stand-by instruction signal from the head position controlling circuit 34 to the arm moving means of the magnetic head device 5. As a result, the magnetic head device 5 is moved from the retreat position A to the stand-by position B as shown in FIG. 1 (Step m4). In this state, although the disk 1 is being rotated, as the distance $\delta_1$ is maintained between the magnetic member 9 and the disk 1 so that the magnetic member 9 will not hit the disk 1 when it vibrates, both can be avoided from being damaged due to the impact between them.

Thereafter, the main control circuit 39 signals to turn ON the pickup drive circuit 35 so as to switch the light source of the optical pickup 3 to low level. As a result, a laser beam of low intensity is projected onto the disk 1. Further, the main control circuit 39 reads a signal corresponding to the light reflected from the disk 1 through the signal processing circuit. Based on this, the main control circuit 39 reads a groove formed beforehand, and figures out a current position of the laser spot. Then, according to the relative positions of the current position of the laser spot and the recording start position input as desired, the main control circuit 39 outputs the instruction signal to the pickup position controlling circuit 36. As a result, the laser spot of the optical pickup 3 is moved to the recording start area on the track formed on the disk 1 as desired (Step m5).

In Step m6, the signal processing circuit 30 reads recording data stored in the memory 32, and outputs the recording data to the head drive circuit 33. The head drive circuit 33 generates drive current (recording signal current) corresponding to the recording data so as to supply to the coil 8 of the magnetic member 9. Additionally, for the memory 32, a memory having a sufficient capacity for signal processing for more than the time required for going through the Steps m1 to m5.

When the current is supplied to the coil 8, the electromagnetic force is generated from the coil 8. Then, the magnetic member 9 is gradually moved toward the disk 1 using the electromagnetic force in a direction opposite to the push-up force from the spring 11. As a result, the buffer 9a provided at the bottom surface of the magnetic head 9 comes in contact with the disk 1. As the current is supplied into the coil 8, the coil 8 generates a magnetic field corresponding to the direction of the current, and the magnetic field is applied onto the magnetic film 1b of the disk 1. Here, the position of the magnetic member 9 is controlled corresponding to the position of the light spot, the position of the magnetic member 9 is placed on the track of the disk 1, where the recording start area is located as desired.

Then, it is set in a wait state until a predetermined time t1 set by the timer has passed (Step m7). After the predetermined time t1 has passed, and the magnetic head 9 has reached the desired recording start area on the track, the main control circuit 39 activates the pickup drive circuit 35 so as to switch the light source of the optical pickup 3 to project a light beam of high intensity through the pickup drive circuit 35 (Step m8). Here, after the timer starts counting, the time required for completing the Steps up to Step m5, and the time required for the disk 1, whose rotation is disturbed by the contact between the magnetic member 9, to recover the normal rotation state are obtained through experiments, and based on the obtained time, the predetermined time t1 is set as desired. As a result, a strong laser beam is projected onto the disk 1 after the disk 1 has reached a normal rotation speed. Thereafter, the data corresponding to the recording signal current being supplied to the coil 8 of the magnetic member 9 from the signal controlling circuit is recorded on a recording start area in order as desired.

The direction of the recording signal current reverses at high speed in response to the content of the recording data. Therefore, the direction of the magnetic field formed in the vicinity of the laser spot on the disk 1 varies in response to the direction of the recording signal current. On the other hand, the temperature of the portion where the laser beam is irradiated of the magnetic film 1b of the disk 1 is raised above its Curie temperature. As a result, the magnetization direction of the portion of the magnetic film 1b, where the light beam is irradiated, raises in response to the magnetic field modulated by the magnetic member 9. Thereafter, the temperature of the portion drops with the shift of the laser spot, the magnetization corresponding to the modulated magnetic field is maintained as a remaining magnetization, and the polarity of the portion is determined. By repeating the above operations in order, the data in response to the recording signal current is recorded.

In a sample circuit shown in FIG. 10, the recording signal current read out from the memory 32 is used as an excitation current for moving the magnetic head 9 in contact with the disk 1. The recording signal current is also used in maintaining the contact state between the magnetic member 9 and the disk 1. This permits an simplification of the controlling system of the current in the magnetic head device 5.

An initial recording signal is used as an exactment signal for activating the magnetic head 9 to come in contact with the disk 1. Therefore, the initial part may not be recorded on the disk 1, which is to be recorded right after the recording operation has started. However, this is not a serious problem. For example, the missing of the initial portion of the recording data which is to be recorded right after the recording operation has started also occur in the case of adopting a tape recorder, however, by muting the portion, a noise can be eliminated. Therefore, the above problem is not serious.

Since the recording signal current is an alternating current, the recording signal current creates a deviation in the size of the electromagnetic force generated from the coil 8. However, changes in the direction of the recording signal current occur at extremely high speed. Therefore, the contact state of the magnetic, member 9 can be maintained without creating any problems.

Additionally, as the number of change in bits (1, 0) in one word of the recording data increases, the electromagnetic force tends to get slightly weaker. Therefore, in order to stabilize the electromagnetic force, the control system preferably has a function for detecting the number of change in the bits in one word and a function for varying the amplification rate of current flowing in the head drive circuit 33 according to the number of change in bit.

Furthermore, the control system activates to switch the light source of the optical pickup 3 from low output to high output after the magnetic member 9 comes in contact with, the normal rotation state of the disk 1 is recovered. This eliminates the problem that an error signal is recorded by the magnetic field which interferes the magnetic film 1b before the output is switched to high output, thereby recording only signals having no errors.

Next, another control system will be explained with reference to the flow chart of FIG. 12 and the block diagram of FIG. 10.

In the flow chart of FIG. 12, the processes in the Steps n1 through n5 are similar to those in the Steps m1 through m5, and after having gone through the Step n5, the sequence moves onto a Step 6 which will be explained in the following.

In the Step n6, the input signal from the input signal source 31 goes through various processes by a signal processing circuit 30. Then, the input signal is stored in the memory 32. The signal processing circuit 30 also supplies the input signal to the coil 8 of the magnetic head device 5 through the head drive circuit 33. As a result, the electromagnetic force is generated from the coil 8 by supplying thereto a current. Furthermore, the magnetic member 9 gradually moves toward the disk 1 in a direction opposite to a push-up force exerted by the spring 11 and the buffer 9a formed on the bottom surface of the magnetic head 9 comes in contact with the disk 1. By supplying a current into the coil 8, the magnetic field having the direction corresponding to the direction of the current is generated from the coil 8, and the magnetic field is applied onto the magnetic film 1b of the disk 1. Additionally, the position of the magnetic member 9 is controlled so as to move in synchronous with the shift of the laser spot. As a result, the position of the magnetic member 9 is set on the track of the disk 1 as desired, where a recording start area is located.

Then, it is set in a wait state until a predetermined time set by the timer has passed (Step n7). After the predetermined time has passed, if the magnetic member 9 has reached the recording start area on the track as desired, the signal processing circuit 30 reads out the recording data previously stored in the memory 32. Then, the signal processing circuit 30 sends a read signal to the head drive circuit 33 in replace of the input signal directly input from the input signal source 31. The head drive circuit 33 generates drive current corresponding to the recording data and supplies it to the coil 8. In the meantime, the main control circuit 39 activates the pickup drive circuit 35 to switch the light source of the optical pickup 3 to high output through the signal processing circuit 30 (Step n8).

As a result, the recording signal can be accurately recorded on the disk 1 in order from the first recording signal. As a result, the problem of missing the initial part of the recording data shown in the control example of FIG. 11 will not arise.

Figure 12:
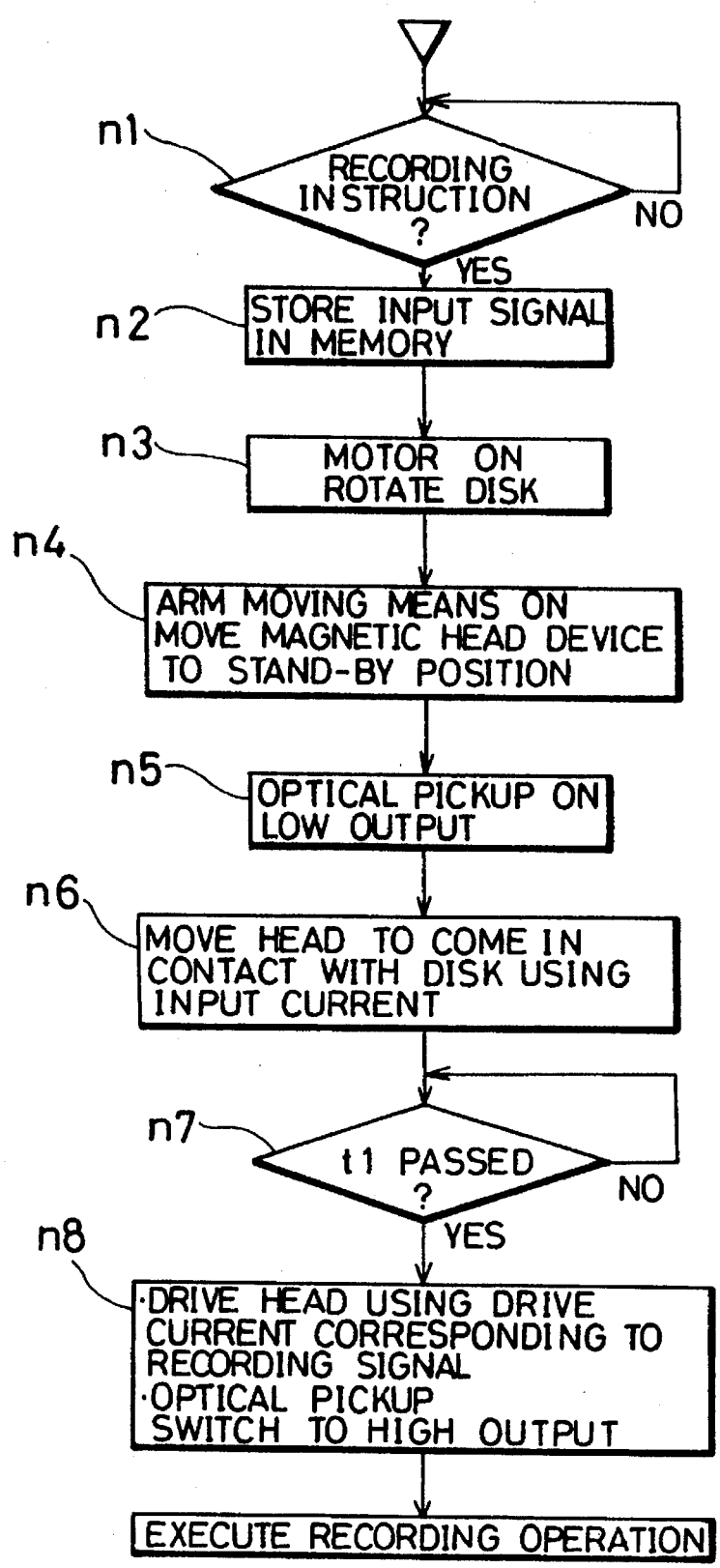
FIG. 12 is a flow chart showing another example of starting process for recording using a magneto-optical recording and reproducing apparatus.

In the process shown in FIG. 12, the coil 8 is driven using the input signal in Step n6. Alternatively, it may be arranged as follows. Dummy current generation means is provided in the signal processing circuit 30, and by supplying a dummy current into the coil 8 of the magnetic member device 5, the magnetic head 9 is moved so as to come in contact with the disk 1.

Furthermore, as will be described later, since the dummy current generation means is provided in the signal processing circuit 30, when it is set in a pause mode which temporarily stops the recording operation, the contact state between the magnetic head and the disk can be maintained using a dummy current. This permits a prompt restart of the recording operation.

Next, the pause mode using the dummy current will be explained with reference to the flow chart of FIG. 13.

Figure 13:
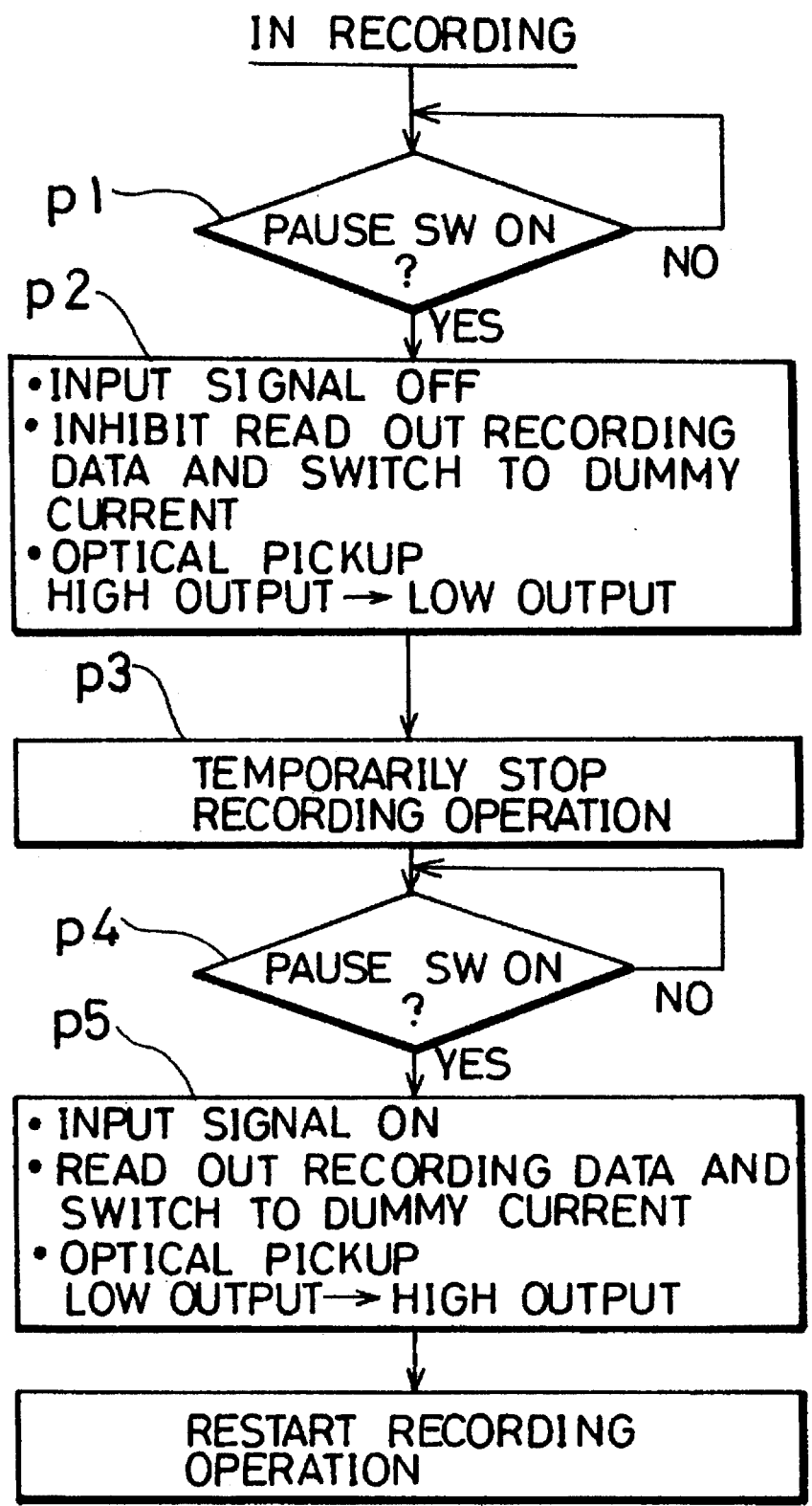
FIG. 13 is a flow chart showing a pause state of the magneto-optical recording and reproducing apparatus.

In FIG. 13, if a pause switch of the key input section 38 is turned ON while a recording operation is being executed (Step p1), the main control circuit 39 outputs a signal to the signal processing circuit 30 to turn OFF the input signal source 31 so that an input signal is not input therefrom. After the recording data has been read out from the memory 32, the main control circuit 39 signals the signal processing circuit 30 to stop the reading out operation, and signals to switch to supply a dummy current. In the meantime, the main control circuit 39 signals the pickup drive circuit 35 to activate the light source of the optical pickup 3 to low output (Step p2).

Then, the coil 8 maintains the contact state between the magnetic member 9 and the disk 1 by the electromagnetic force generated by the dummy current. In this state, the magnetic field generated from the magnetic member 9 interferes the magnetic film 1b of the disk 1. However, as the light source is switched from high output to low output, the temperature of the spot illuminated by the laser beam is not raised above its Curie temperature. This means that the signal is not recorded. As a result, the recording operation on the disk 1 is temporarily stopped (Step 3).

In the pause state, if the pause switch of the key input section 38 is pressed, the main control circuit 39 signals to restart the recording operation after confirming that the pause switch is pressed second time (Step p4). In more detail, the main control circuit 39 signals the signal processing circuit 30 to turn ON the input signal source 31 so that an input signal is input therefrom. In the meantime, the main control circuit 39 signals the signal processing circuit 30 to read out the recording data from the memory 32. Further, the main control circuit 39 signals to switch from dummy current to recording signal current, and signals the pickup drive circuit 35 to switch the output of the optical pickup 3 (Step p5). Then, the recording operation is restarted.

In the control example shown in FIGS. 10 through 13, the magneto-optical recording and reproducing apparatus provided with the magnetic head device employed in the first embodiment shown in FIGS. 1 through 3 has been used. However, the present invention is not intended to be limited to this, for example, those employed in the second through fourth embodiments may be used as well.

Next, another example of controlling system in the magneto-optical recording and reproducing apparatus will be explained with reference to the block diagram of FIG. 14. In addition, the controlling system is designed so as to separately control the coil of the magnetic head and the coil of the head moving means.

The controlling system in FIG. 14 will be explained in detail with reference to the magnetic head device employed in the third embodiment shown in FIGS. 6 and 7. The configuration of the controlling system in FIG. 14 is the same as that of FIG. 10, except that an up-down drive circuit 40 is additionally provided.

Figure 14:
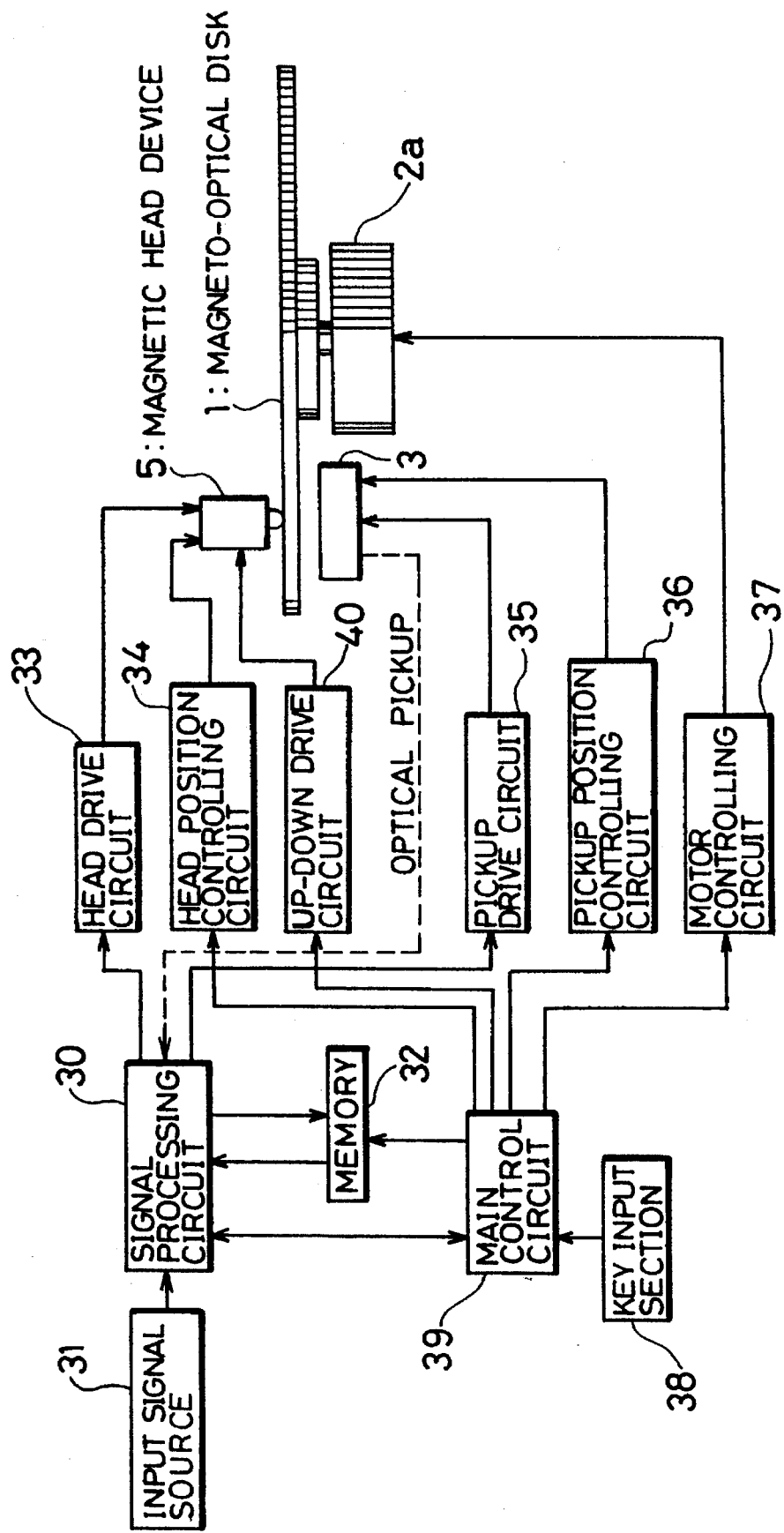
FIG. 14 is a block diagram showing another example of the controlling system of the magneto-optical recording and reproducing apparatus employing the magnetic field modulation using the magnetic head device of the present invention.

In the example of the controlling system shown in FIG. 14, the head drive circuit 33 controls the coil 20 of the magnetic head 19, and the up-down drive circuit 40 controls the coil 8 of the head moving means.

Figure 15:
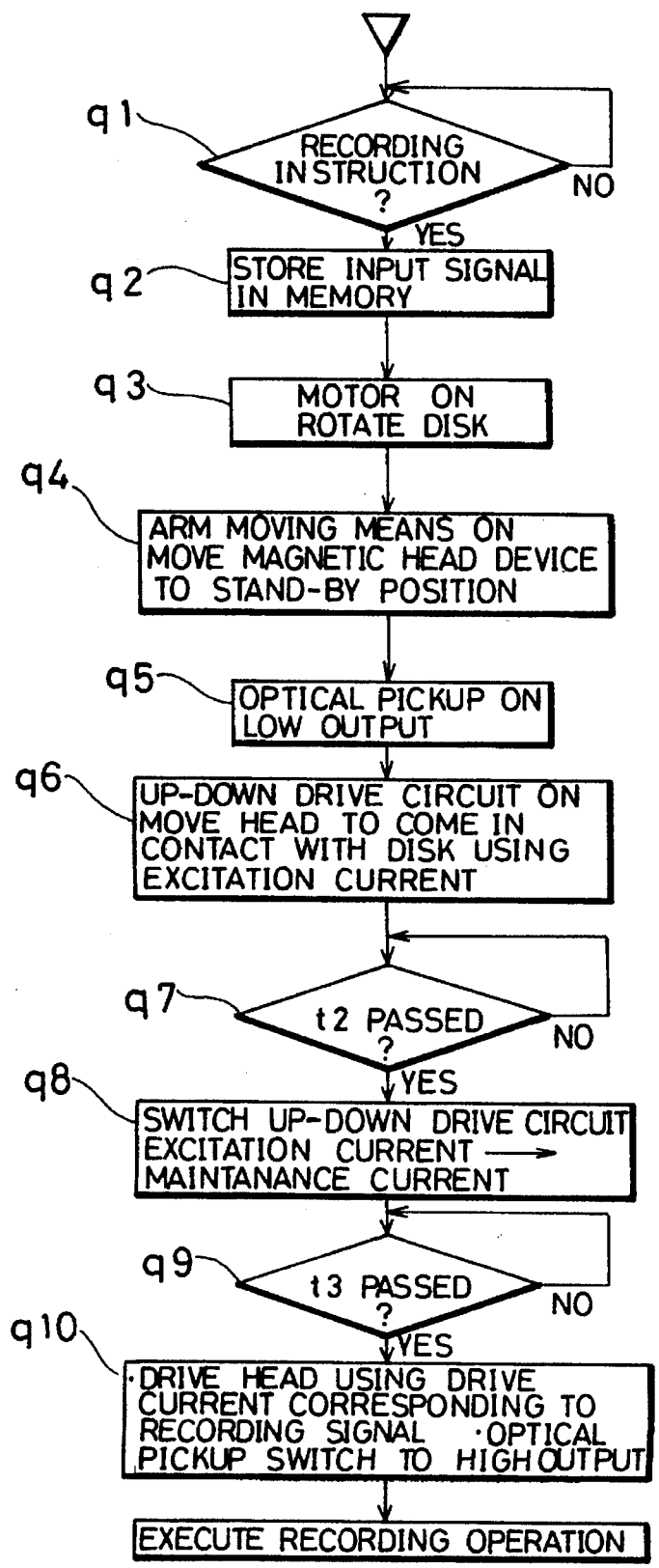
FIG. 15 is a flow chart showing an example of a starting process for recording using the magneto-optical recording and reproducing apparatus.
Figure 16:
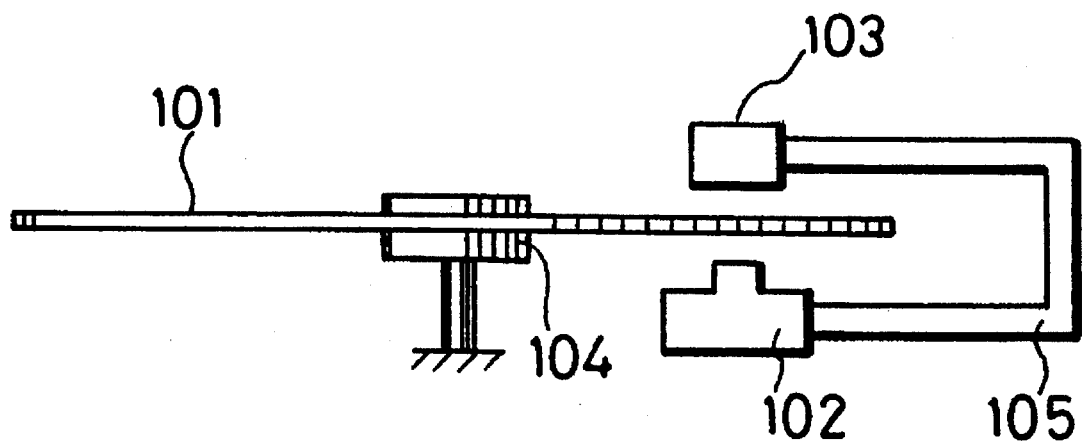
FIGS. 16 through 19 show prior arts.
Figure 17:
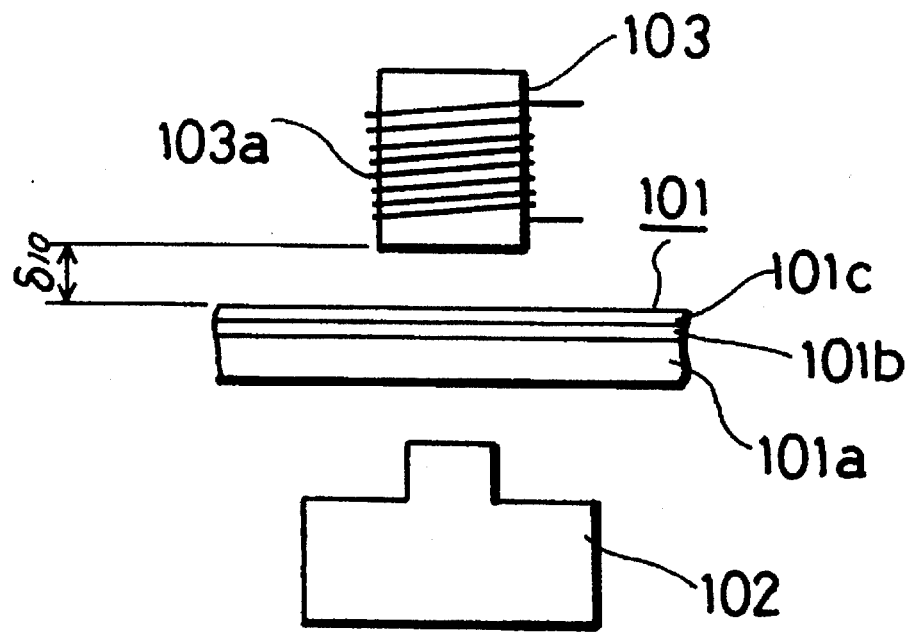
Figure 18:
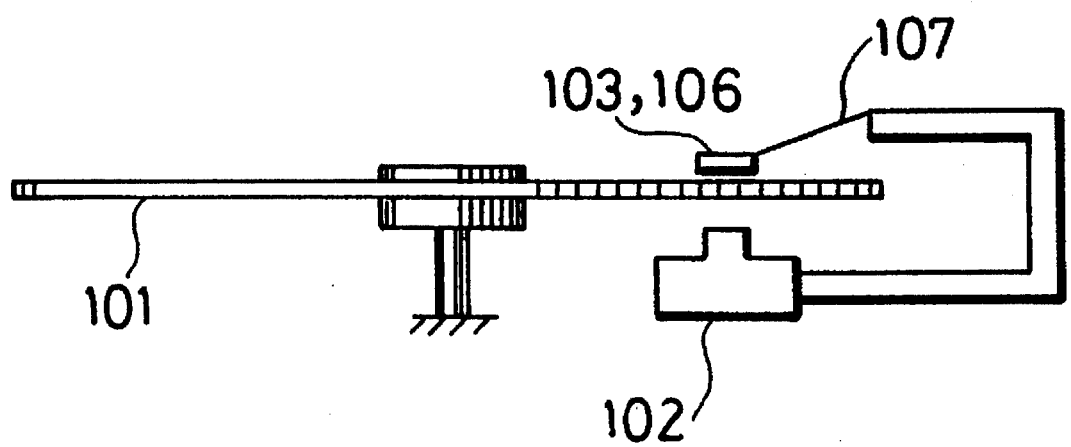
Figure 19:
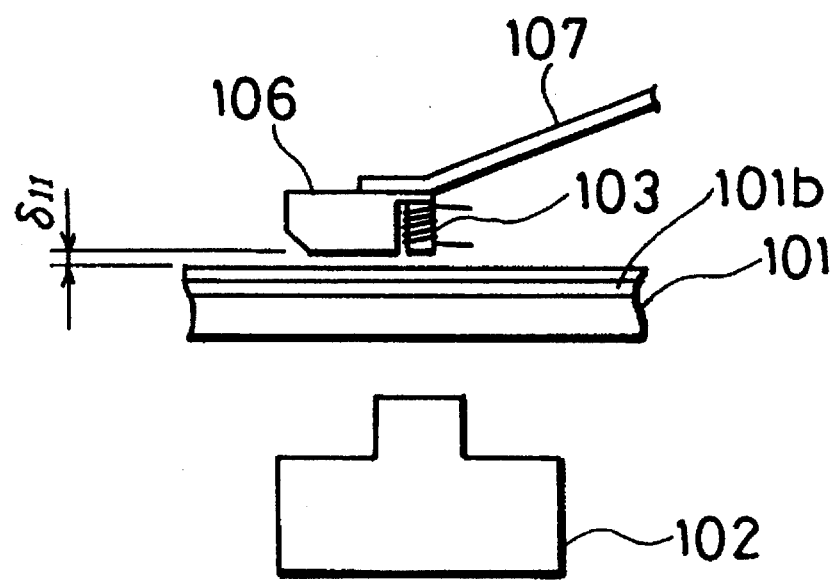

The following will describe the control system with reference to the magnetic head device 5 shown in FIGS. 6 and 7, and the flow chart of FIG. 15.

After a recording start area, a recording instruction, etc., are input in the key input section 38, the main control circuit 39 confirms that the recording instruction is given (Step q1). Then, the main control circuit 39 signals the signal processing circuit 30 to receive an input signal from the input signal source 31. Then, after having gone through various controls in the signal processing circuit 30, the input signal is stored in order in the memory 32 (Step q2). The main control circuit 39 also signals to turn ON the motor controlling circuit 37, and the disk loaded on the turn table 2 starts rotating (Step q3).

Next, the main control circuit 39 signals to turn ON the head position controlling circuit 34. As a result, a stand-by instruction signal is output from the head position controlling circuit 34 to the arm moving means of the magnetic head device 5. Consequently, the magnetic head device 5 is moved from a retreat position located far from the disk 1 to a stand-by position shown in FIG. 6 (Step q4). In this state, although the disk 1 is being rotated, the magnetic member 9 at the stand-by position, located above the disk 1, maintains a distance $\delta_1$ from the disk 1, the magnetic member 9 and the disk 1 can be prevented from being damaged due to an impact between them.

Then, the main control circuit 39 signals to turn ON the pickup drive circuit 35. Further, the pickup drive circuit 35 controls the light source of the optical pickup 3 to switch to low output so that a weak laser beam is projected onto the disk 1. The main control circuit 39 reads a signal corresponding to the light reflected from the disk 1 through the signal processing circuit 30, further reads a previously formed groove based on the signal, and figures out the present position of the laser spot. Then, based on the relative position between the laser spot and the input recording start area as desired, an instruction signal is output to the pickup position controlling circuit 36. As a result, the laser spot formed on the disk 1 by the optical pickup 3 is moved to a track on the disk, whereon a desired recording start area is located (Step q5).

Next, the main control circuit 39 outputs a signal indicating to move the head to the up-down drive circuit 40. Then, an excitation current is supplied from the up-down drive circuit 40 to the coil 8. By supplying thereto a current, the electromagnetic force is generated from the coil 8, and the magnetic substance 9' is attracted by the electromagnetic force in a direction opposite to the push-up force exerted by the spring 11. With the motion of the magnetic substance 9', the magnetic head 19 comes closer to the disk 1, and finally the bottom end 19a of the magnetic head 19 comes in contact with the disk 1. Here, the size of the excitation current is set the minimum current satisfying that the magnetic head 19 can move in a direction opposite to the push up force exerted by the spring 11, so that the impact accompanied by the contact between the magnetic head 19 and the disk 1 is minimized.

After supplying a current into the coil 8, if it is determined that a predetermined time t2 has passed (Step q7), the up-down drive circuit 40 switches the current being supplied to the coil 8 from the excitation current to the maintaining current for maintaining the contact state between the magnetic head 19 and the disk 1 based on the instruction form the main control circuit 39 (Step q8). Here, the size of the maintaining current is set minimum current satisfying that the contact state between the magnetic head 9 and the disk 1 can be maintained even if the disk vibrates. As a result, the damage due to the contact between them can be minimized.

Further, after the predetermined time t3 has passed (Step q9), the signal processing circuit 30 reads out the recording data stored in the memory 32 in order based on the instruction from the main control circuit 39, and sends the reading data to the head drive circuit 33. As a result a drive current corresponding to the recording data is generated from the head drive circuit 33, and the drive current is supplied to the coil 20 of the magnetic head 19. The pickup drive circuit 35 also switches the light source of the optical pickup 3 to high output based on instruction from the main control circuit 39 (Step q10).

Additionally, the predetermined time t3 is set based on the time required for the disk 1 to recover the normal rotation state after the disk 1 starts vibrating due to the magnetic head 19 in contact therewith after a current is supplied to the coil 8. After the normal rotation speed of the disk 1 is recovered, a drive current is supplied to the coil 20 of the magnetic head 19. Then, the optical pickup 3 is switched to high output, thereby restarting the recording operation. In this way, since the recording signal can be accurately recorded in order from the first signal, the recording operation can be performed without an error in the recording signal.

According to the above control system, the head moving means (coil 8) is independently controlled without using the recording signal current, the change in the electromagnetic force does not occur. As a result, a stable contact state between the disk 1 and the magnetic head 19 can be maintained. Further, when the magnetic head 19 is moved toward the disk 1 in a direction opposite to the force exerted from the spring 11 so as to come in contact with the disk 1, and when maintaining the contact state between them, the current respectively used for the above purposes can be set minimum. Therefore, the magnetic head 19 and the disk 1 can be prevented from being damaged, in the mean time, the wasting of electric power can be also prevented.

Further, since the head moving means can be controlled independently from the magnetic head 19. Thus, when the pause switch is turned ON while the recording operation is being executed, the contact state between the magnetic head 19 and the disk 1 can be maintained, thereby enabling to promptly restarting the recording operation.

Additionally, the above control system is not restricted to be used in the third embodiment shown in FIGS. 6 and 7, and it is also applicable to the fourth embodiment shown in FIG. 9.

While this invention has been disclosed in conjunction with specific embodiments thereof, it is evident that may alternatives, modifications and variations will be apparent to those skilled in the art in light of the foregoing description. Accordingly, it is intended to embrace all such alternatives, modifications, and variations as fall within the sprint and ground scope of the appended claims.

What is claimed is:

1. A magnetic head device for applying a recording magnetic field corresponding to a recording signal current onto a magneto-optical disk comprising:

coil support means including a hollow tubular portion;

only a single coil provided outside the hollow tubular portion of said coil support means;

a cylindrical magnetic member, slidably provided within the hollow tubular portion of said coil support means, for generating the recording magnetic field by supplying the recording signal current into said single coil; and elastic support means for exerting an elastic force that supports said magnetic member in a stand-by position where said magnetic member and the magneto-optical disk do not contact, said magnetic head device moving said magnetic member toward the magneto-optical disk in response to an electromagnetic force generated by supplying the recording signal current to said single coil opposing the elastic force in a direction opposite to the elastic force exerted by said elastic support means so that one end of said magnetic member comes in contact with the magneto-optical disk.

2. The magnetic head device as set forth in claim 1, wherein said magnetic member is provided with a buffer at a portion in contact with the magneto-optical disk.

3. The magnetic head device as set forth in claim 2, wherein said buffer is formed by being coated with molybdenum or ceramic.

4. The magnetic head device as set forth in claim 2, wherein said buffer is formed by laminating films.

5. The magnetic head device as set forth in claim 1, wherein said elastic support means includes:

a spring supporting member provided on said magnetic member; and a spring, placed between said spring supporting member and said coil support means, for exerting a force toward said magnetic member in a direction moving away from the magneto-optical disk.

6. The magnetic head device as set forth in claim 5, wherein said spring supporting member is provided on said magnetic member via position adjusting means which enables a distance between said spring supporting member and said magnetic member to be set as desired.

7. The magnetic head device as set forth in claim 1, further comprising position adjusting means which enables an adjustment of the stand-by position.

8. The magnetic head device as set forth in claim 1, wherein:

said magnetic means includes a magnetic substance and is supported by said elastic support means such that said magnetic substance moves against the push-up force exerted by said elastic support means when a recording signal current is applied into said coil means.

9. The magnetic head device as set forth in claim 1, wherein:

a central axis of said coil means is :set on an axis of the hollow tubular portion in a direction substantially perpendicular to a disk surface.

10. A magneto-optical recording and reproducing apparatus for recording data on a magneto-optical disk through magnetic field modulation, comprising:

a magnetic head device which includes:

coil support means having a hollow tubular portion;

a single coil provided outside the hollow tubular portion of said coil support means;

magnetic means slidably provided within the hollow tubular portion of said coil support means; and elastic support means for supporting said magnetic means so as to place it in a stand-by position where said magnetic means and the magneto-optical disk do not contact with one another by an elastic force exerted on said magnetic means in a direction moving away from the magneto-optical disk; and control means, including memory means for temporarily storing the recording data, for generating an electromagnetic force by supplying an excitation current to said single coil that the moves said magnetic means toward the magneto-optical disk in a direction opposite to the elastic force exerted by said elastic support means so as to come in contact with the magneto-optical disk when starting a recording operation, and after the magneto-optical disk has reached a desired rotation speed, said control means supplying a recording signal current to said single coil to record data read out from said memory means.

11. The magneto-optical recording and reproducing apparatus as set forth in claim 10 wherein said control means includes dummy current generation means for supplying a dummy signal current after being switched into a recording signal current so as to maintain a contact state between said magnetic means and the magneto-optical disk when the recording operation is temporarily stopped in a pause state.

12. The magneto-optical recording and reproducing apparatus as set forth in claim 10, wherein said control means is arranged so as to change an amplification factor corresponding to the recording signal current.

13. A magneto-optical recording and reproducing apparatus for recording data on a magneto-optical disk through magnetic field modulation, comprising:

a magnetic head device which includes:
coil support means having a hollow tubular portion;
a single coil provided outside the hollow tubular portion of said coil support means;
magnetic means slidably provided within the hollow tubular portion of said coil support means; and
elastic support means for supporting said magnetic head means so as to place it in a stand-by position where said magnetic means and the magneto-optical disk do not contact with one another by an elastic force exerted on said magnetic means in a direction moving away from the magneto-optical disk;

an optical pickup for raising a temperature of a recording portion of the magneto-optical disk by projecting a laser beam onto the magneto-optical disk; and control means, including memory means for temporarily storing the recording data, for generating an electromagnetic force by supplying thereto an excitation current to said single coil that then moves said magnetic means toward the magneto-optical disk in a direction opposite to the elastic force exerted by said elastic support means so as to come in contact with the magneto-optical disk when starting a recording operation, said control means being arranged so as to supply to said single coil a recording signal current corresponding to the recording data read out from said memory means when the magneto-optical disk has reached a desired rotation speed, and also arranged so as to raise the temperature of the recording portion above its Curie temperature.

* * * * *